Figure 1:
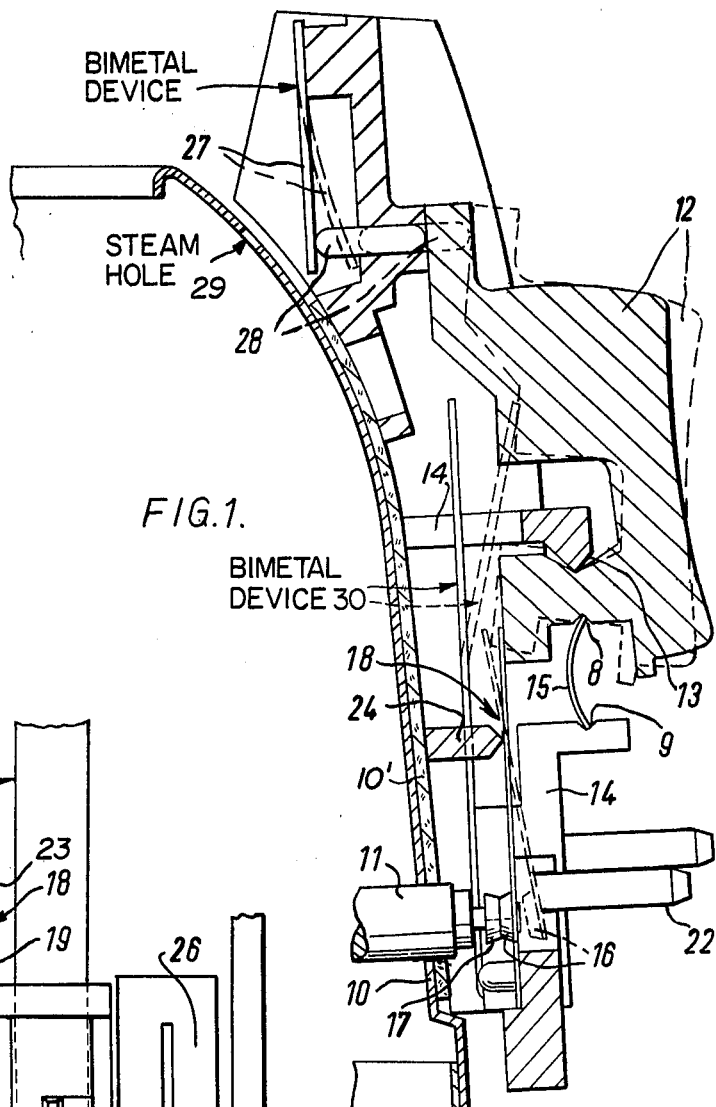

United States Patent [19]

Inskip et al.

[11] 4,430,556
[45] Feb. 7, 1984

[54] ELECTRIC LIQUID HEATING APPLIANCE

[75] Inventors: Michael Inskip, Stoke-on-Trent; Alan Warren, Western Downs, both of England

[73] Assignee: TI Russell Hobbs Limited, England

[21] Appl. No.: 274,265

[22] Filed: Jun. 16, 1981

[30] Foreign Application Priority Data

Jun. 18, 1980 [GB] United Kingdom ............... 8019848

[51] Int. Cl.³ .......................... F24H 1/00; H05B 3/02
[52] U.S. Cl. .................................. 219/328; 219/437; 219/441; 219/331
[58] Field of Search ............... 219/328, 331, 437, 441, 219/442, 436, 438

[56] References Cited

FOREIGN PATENT DOCUMENTS 1470367 of 0000 United Kingdom .
1321824 of 0000 United Kingdom .
836206 of 0000 United Kingdom .
1105754 of 0000 United Kingdom ............... 219/437
1408389 of 0000 United Kingdom ............... 219/437
892685 of 0000 United Kingdom ............... 219/437

Primary Examiner—B. A. Reynolds
Assistant Examiner—Teresa Walberg
Attorney, Agent, or Firm—Leydig, Voit, Osann, Mayer and Holt, Ltd.

[57] ABSTRACT

The appliance, e.g. an electric kettle has a body shell, a heating element within the body shell and having two ends which project through the body shell to the outside thereof, and a switch housing mounted on the outside of the body shell. A pair of switching contacts are opened and closed by a switch operating member or dolly. One of the switching contacts is movable by the dolly and is supported relative to the housing. The other switching contact is a fixed contact and is provided at one end of the heating element.

5 Claims, 2 Drawing Figures

ELECTRIC LIQUID HEATING APPLIANCE

This invention relates to an electric liquid heating appliance, and particularly but not exclusively relates to an electric kettle.

It is known to provide an electric kettle with a body shell, a heating element within the body shell and a switch housing mounted on the outside of the body shell. An on/off switch comprises a pair of switching contacts relatively movable between open and closed positions by a switch operating member supported by the switch housing. In these known kettles the pair of switching contacts are also supported by the switch housing and are physically disposed at a position remote from each end of the heating element.

According to the present invention, there is provided an electric liquid heating appliance comprising a body shell, a heating element within the body shell and having two ends which project through the body shell to the outside thereof, a switch housing mounted on the outside of the body shell, and a pair of switching contacts relatively movable between open and closed positions by a switch operating member supported by the switch housing, wherein one of the switching contacts is movable by the switch operating member and is supported relative to the switch housing and the other switching contact is a fixed contact and is provided at one end of the heating element.

It is thus possible to provide an electric liquid heating appliance with a switch assembly which is simpler and cheaper to manufacture than was hitherto possible.

Preferably, if the appliance is a kettle, it is provided with a device for automatically switching it off when water boils therein and also with a temperature-protective device for switching it off if the heating element is not immersed in water. The heating element is normally immersed when heating water.

Conveniently, the movable contact is mounted on a resilient blade-like electrically conductive element having two parallel fingers portions integrally connected at one end by a transverse portion, the free end of one of the finger portions being connected to one of two terminal pins, the movable contact being mounted on the free end of the other finger portion, and the switch operating member being engageable with the transverse portion and/or one or both fingers portions at a position adjacent the transverse portion for pivoting the other finger portion about a pivot disposed between its ends hence to move the movable contact from one to the other of the open and closed position relative to the fixed contact.

Conveniently, a further resilient blade-like electrically conductive element is connected to the other of the two terminal pins and engages the other end of the heating element.

Figure 2:
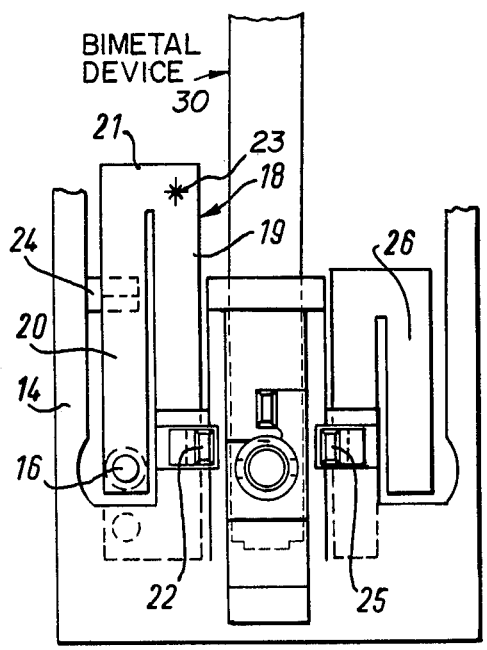

The invention will now be more particularly described, by way of example, with reference to the accompanying drawing, wherein:

FIG. 1 is a sectional side view of a switch assembly of one embodiment of an appliance according to the invention; and FIG. 2 is a right hand end view of part of the switch assembly shown in FIG. 1.

Referring to the drawings, there is shown therein a switch assembly for an electric kettle having a body shell 10 and a heating element 11 within the body shell 10. The heating element 11 is secured to the body shell by a fixing assembly (not shown) and the two ends of the heating element 11 (only one of which is shown) project through the body shell to the outside thereof and are sealed relative to the body shell.

A switch assembly includes a dolly (switch operating member) 12 which can rock between a first position—shown in full lines in FIG. 1 and a second position—shown in broken lines in FIG. 1. It rocks about a pivot 13 supported by a switch housing 14 and is urged into engagement with the pivot 13 by a bowed leaf spring 15 seated at one end in a recess 8 provided in the dolly and at an opposite end in a recess 9 provided in the switch housing 14. A gasket $10^1$ is between the switch housing 14 and the body shell 10.

The switch assembly also includes a pair of switching contacts 16 and 17 relatively movable between open and closed positions. The contact 16 is a movable contact mounted on a resilient blade-like electrically conductive element 18 whereas the contact 17 is a fixed contact and is provided on one of the two ends of the heating element 11. The element 18 adopts the position shown in FIG. 1 in full lines in its working position and in this position the contacts 16 and 17 are closed. However, the element is movable to the position shown in FIG. 1 in broken lines by a rocking movement of the dolly 12 from its first to its second position when the kettle is switched off.

As shown in FIG. 2, the element 18 has two parallel finger portions 19 and 20 integrally connected at one upper end by a transverse portion 21. The lower end of the finger portion 19 is supported relative to the switch housing 14 and is connected to a first terminal pin 22. The movable contact 16 is secured to the free lower end of the other finger portion 20. As shown, the dolly 12 engages a region of the transverse portion indicated at 23 at the upper end of the element as it rocks from its first to its second position and thus rocks the finger portion 20 about a pivot 24, supported by the switch housing 14 intermediate the ends of the finger portion 20, to the position shown in FIG. 1 in broken lines, hence opening the contacts 16 and 17. When the dolly 12 is returned to its first position the element 18 again adopts the position shown in FIG. 1 in full lines and the contacts 16 and 17 close.

Although the dolly 12 as described and illustrated engages the element 18 at the region indicated at 23, it may alternatively engage any other region of the transverse portion 21 and/or one or both finger portions 19, 20 at a position adjacent the transverse portion to effect the necessary rocking movement of finger portion 20 about pivot 24.

A second terminal pin 25 supported by the switch housing 14 is connected to a further resilient blade-like conductive element 26 which contacts the other end of the heating element.

The kettle is preferably of an automatic type which has a bimetal device 27 which through the intermediary of a push rod 28 rocks the dolly to its second position when water in the kettle boils and produces steam which passes through an opening 29 in the body shell 10 above the normal level of liquid to act on the bimetal device 27 which senses the steam, thereby opening the contacts 16 and 17 and hence interrupting the power supply to the heating element.

Also, the kettle may be provided with a temperature protective device comprising a further bimetal device 30 which is supported by the switch housing and is responsive to the temperature of the heat transmitting surfaces of the heating element to rock the dolly to its second position in a situation in which there is insufficient water in the kettle to cover the heating element, when the heating element is energised.

In addition to a kettle as described, the invention can be applied to tea makers, milk warmers, coffee percolators, immersion heaters, and other kinds of electric liquid heating appliances.

We claim:

1. An electric liquid heating appliance comprising a body shell, a heating element within the body shell and having two ends which project through the body shell to the outside thereof, a switch housing mounted on the outside of the body shell, a switch comprising a pair of switching contacts and a switch operating member which is supported by the switch housing and which is manually operable both to close and open the switching contacts, said switch having a resilient blade-like electrically conductive element movable by said switch operating member, one of the switching contacts comprising a fixed contact provided directly on one end of the heating element and the other switching contact comprising a movable contact provided on the blade-like electrically conductive element, and means supported by the switch housing and mounted to sense steam from within the body shell for moving the switch operating member to move said blade-like element and open the contacts when a liquid in the appliance boils.

2. An electric liquid heating appliance according to claim 1 wherein said heating element having two ends which project through the body shell is normally immersed in liquid in the body shell, said steam sensing means for moving the switch operating member when liquid boils is mounted above the normal level of liquid and spaced from the heating element, and said blade-like element and switch operating member are mounted between said steam sensing means and the fixed contact on one end of said heating element, the movable switching contact being mounted on the free lower end of said blade-like element and the upper end of said blade-like element being engageable by said switch operating member to move said blade-like element to open and close the contacts.

3. The appliance of claim 1, wherein the movable contact is mounted on a resilient blade-like electrically conductive element having two parallel finger portions integrally connected by a transverse portion, one of the finger portions being connected to a terminal pin, the movable contact being mounted on the free end of the other finger portion, and the switch operating member being engageable with said element in the region of said transverse portion for pivoting the other finger portion about a pivot disposed between its ends hence to move the movable contact from one to the other of the open and closed position relative to the fixed contact.

4. The appliance of claim 3 wherein a further resilient blade-like electrically conductive element is connected to a further terminal pin and engages the other end of the heating element.

5. The appliance of claim 1, having a temperature-protective device for switching off the appliance if the heating element is not immersed in liquid.

* * * * *